United States Patent
Ko et al.

(10) Patent No.: US 9,027,040 B2
(45) Date of Patent: May 5, 2015

(54) OPTICAL DISC DRIVE CONFIGURED TO DISCHARGE STATIC ELECTRICITY

(71) Applicant: Toshiba Samsung Storage Technology Korea Corporation, Suwon-si (KR)

(72) Inventors: Jung Sug Ko, Seoul (KR); Sang Yun Baek, Seongnam-si (KR); Cheol Woong Ahn, Seoul (KR); Jae Gil Yu, Suwon-si (KR); Un Jin Choi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/093,719

(22) Filed: Dec. 2, 2013

(65) Prior Publication Data

US 2014/0223455 A1   Aug. 7, 2014

(30) Foreign Application Priority Data

Feb. 6, 2013   (KR) ..................... 10-2013-0013475

(51) Int. Cl.
*G11B 33/14*   (2006.01)
(52) U.S. Cl.
CPC ........................... *G11B 33/1493* (2013.01)

(58) Field of Classification Search
USPC .................. 720/650, 652, 646, 659, 654
See application file for complete search history.

(56) References Cited

U.S. PATENT DOCUMENTS

| | | | |
|---|---|---|---|
| 7,363,638 B2* | 4/2008 | Peng ............................ | 720/650 |
| 8,359,607 B2* | 1/2013 | Yamauchi et al. ............ | 720/650 |
| 8,520,479 B2* | 8/2013 | Lee et al. .................... | 369/44.14 |
| 2006/0212891 A1* | 9/2006 | Chen et al. ................... | 720/689 |
| 2007/0074234 A1* | 3/2007 | Peng ............................ | 720/650 |
| 2007/0279830 A1* | 12/2007 | Chiou et al. .................. | 361/220 |
| 2009/0086777 A1* | 4/2009 | Nakane ..................... | 372/29.021 |
| 2011/0258650 A1* | 10/2011 | Yamauchi et al. ............ | 720/695 |
| 2012/0199761 A1* | 8/2012 | Takanashi et al. .......... | 250/578.1 |

* cited by examiner

*Primary Examiner* — Allen T Cao
(74) *Attorney, Agent, or Firm* — NSIP Law

(57) ABSTRACT

Provided is an optical disc drive that may discharge static electricity externally. The optical disc drive may include a step motor that is configured to move an optical pickup back and forth and a cover disposed below the optical pickup. In one aspect, the cover includes an electrostatic discharge mechanism for moving static electricity generated on the step motor through the cover.

13 Claims, 4 Drawing Sheets

OPTICAL DISC DRIVE CONFIGURED TO DISCHARGE STATIC ELECTRICITY

CROSS-REFERENCE TO RELATED APPLICATION(S)

This application claims the benefit under 35 USC §119(a) of Korean Patent Application No. 10-2013-0013475, filed on Feb. 6, 2013, in the Korean Intellectual Property Office, the entire disclosure of that is incorporated herein by reference for all purposes.

BACKGROUND

1. Field

The following description relates to an optical disc drive that includes an electrostatic discharge mechanism.

2. Description of Related Art

An optical disc drive may record data on an optical disc and read data recorded on the optical disc. An optical pickup disposed on the optical disc drive may include various components such as a laser diode, a photo diode, a diffraction grid, a sensor lens, a mirror, an objective lens, and the like, and may perform a function of recoding data or reading data previously recorded. In operation, a number of these components require electricity. When components come into contact, electrons may move from one component to another, which may leave an excess of charge on one or more of the components. This excess charge is referred to as static electricity. This excess charge remains until it is removed by means of an electrical current or an electrical discharge.

When static electricity generated on the optical disc drive is not discharged externally in an appropriate manner, the static electricity may exert an influence on internal elements, including the optical pickup. In addition, static electricity may also cause a defect or impede a function of the optical disc drive. In the conventional optical disc drive, to avoid such adverse effects, the optical disc drive typically has a separate electrostatic discharge mechanism.

For example, an optical disc drive using a main base provided in a form of a mold may use an additional part for discharging static electricity generated due to a nonconductive mold. However, adding an additional part to the optical disc drive in order to discharge static electricity may have several drawbacks in terms of process, design, and costs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, there is provided an optical disc drive, including a step motor configured to move an optical pickup back and forth, and a cover disposed below the optical pickup, the cover comprising an electrostatic discharge mechanism for removing static electricity generated on the step motor.

The electrostatic discharge mechanism may include a portion of the cover that comprises a tension structure that electrically connects the cover to the step motor.

The electrostatic discharge mechanism may be disposed on the cover to electrically connect the cover and the step motor.

The static electricity generated on the step motor may be moved to a ground through the cover that is electrically connected to the electrostatic discharge mechanism.

The static electricity generated on the step motor may be moved to a ground by sequentially passing the static electricity through the cover, a ground plate electrically connected to the cover, and a circuit board electrically connected to the ground plate.

The optical disc drive may further comprise a ground plate electrically connected to the cover, and a circuit board electrically connected to the ground plate, wherein a portion of the cover comprises a tension structure that electrically connects the cover to the step motor, and static electricity generated on the step motor is moved to the cover through the tension structure and discharged externally through the ground plate and the circuit board.

In an aspect, there is provided an optical disc drive, including a spindle motor configured to drive an optical disc, a screw fastened to the spindle motor, and a cover disposed on an optical pickup of the optical disc drive, the cover comprising an electrostatic discharge mechanism for removing static electricity generated on the cover through the screw.

The electrostatic discharge mechanism may include a portion of the cover that comprises a tension structure that electrically connects the cover to the screw.

The electrostatic discharge mechanism may be disposed on the cover to electrically connect the cover and the screw.

The static electricity generated on the cover may be moved to a ground through the screw that is electrically connected to the electrostatic discharge mechanism.

The static electricity generated on the cover may be moved to a ground by sequentially passing the static electricity through the screw, the spindle motor, a ground plate electrically connected to the spindle motor, and a circuit board electrically connected to the ground plate.

The optical disc drive may further comprise a ground plate electrically connected to the spindle motor, and a circuit board electrically connected to the ground plate, wherein a portion of the cover comprises a tension structure that electrically connects the cover to the screw, and static electricity generated on the cover is moved to the screw through the tension structure and discharged externally through the ground plate and the circuit board.

In an aspect, there is provided an optical disc drive, including a step motor configured to move an optical pickup back and forth, a first cover disposed below the optical pickup, a second cover disposed on the optical pickup, a spindle motor configured to drive an optical disc, and a screw fastened to the spindle motor, wherein the first cover comprises a first electrostatic discharge mechanism for moving static electricity generated on the step motor through the first cover, and the second cover includes a second electrostatic discharge mechanism for moving static electricity generated on the second cover through the screw.

The first electrostatic discharge mechanism may include a portion of the first cover that comprises a tension structure that electrically connects the first cover to the step motor, and the second electrostatic discharge mechanism may include a portion of the second cover that comprises a tension structure that electrically connects the second cover to the screw.

Other features and aspects will be apparent from the following detailed description, the drawings, and the claims.

Figure 1:
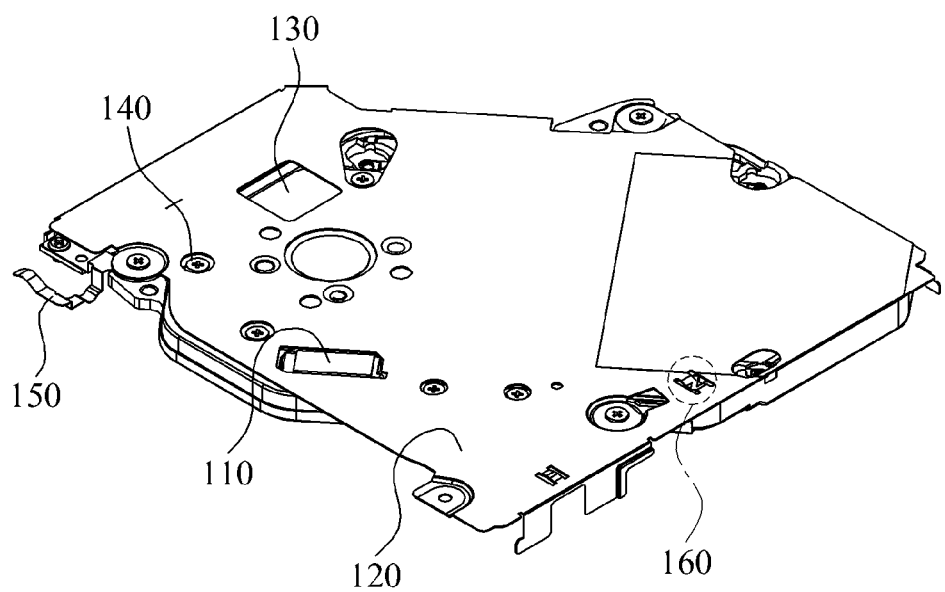
FIG. 1 is a diagram illustrating an example of a first cover including a first electrostatic discharge mechanism.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The to progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a first cover 120 including a first electrostatic discharge mechanism.

Referring to FIG. 1, an optical disc drive includes a step motor 110 to move an optical pickup (not shown) back and forth and the first cover 120 disposed below the optical pickup. For example, the first cover 120 may refer to a cover-deck. The optical pickup may record data on an optical disc and/or read data recorded on the optical disc.

According to various aspects, the first cover 120 includes an electrostatic discharge mechanism (hereinafter, referred to as a first electrostatic discharge mechanism) 160 for moving static electricity generated on the step motor 110 through the first cover 120. The first electrostatic discharge mechanism 160 may be disposed on the first cover 120 such that the first cover 120 and the step motor 110 are in contact or otherwise connected.

Static electricity generated on the step motor 110 may be moved to a ground through the first cover 120 connected to the first electrostatic discharge mechanism 160. For example, static electricity generated on the step motor 110 may be moved to a ground by being sequentially passed through the first cover 120, a ground plate 150 connected to the first cover 120, and a circuit board, for example, a printed circuit board (PCB), (not shown) connected to the ground plate 150.

In the first electrostatic discharge mechanism 160, a portion of the first cover 120 may be a tension structure capable of connecting the first cover 120 to the step motor 110. In this example, static electricity generated on the step motor 110 may be moved to the first cover 120 because the tension structure of the first cover 120 is connected to the step motor 110. Accordingly, the first electrostatic discharge mechanism 160 may connect the step motor 110 and the first cover 120 using the tension structure to allow static electricity that is generated on the step motor 110 to be moved through the first cover 120.

Accordingly, the optical disc drive may externally discharge static electricity generated on the step motor using the tension structure and without the need for using or designing a separate part for discharging static electricity.

As is further described herein, the optical disc drive may include a second electrostatic discharge mechanism to externally discharge static electricity generated on a second cover to a ground. For example, the second cover may be a polyurethane cover (cover-PU). The second electrostatic discharge mechanism may discharge static electricity externally through a spindle motor 130 and a screw 140 fastened to the spindle motor 130. Further details will be described with reference to FIG. 3.

Figure 2:
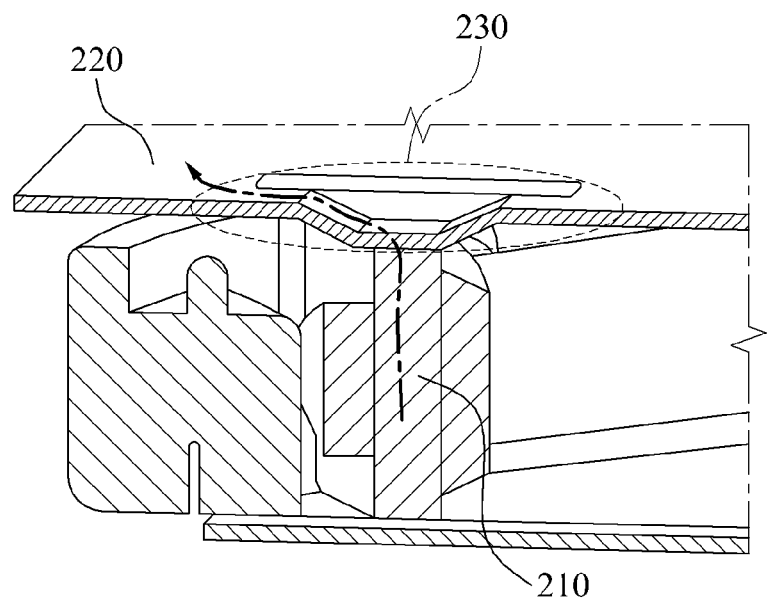
FIG. 2 is a diagram illustrating an example of a first electrostatic discharge mechanism.

FIG. 2 illustrates an example of a first electrostatic discharge mechanism.

Referring to FIG. 2, the first electrostatic discharge mechanism may connect a step motor 210 to a first cover 220 using a tension structure as indicated by a dotted line circle 230. A portion of the first cover 220 may include the tension structure and thus, the step motor 210 and the first cover 220 may contact each other without using a separate part. Accordingly, static electricity generated on the step motor 210 may be moved to the first cover 220, and static electricity moved to the first cover 220 may be moved to a ground through a ground plate (not shown) connected to the first cover 220.

Accordingly, excess charge created by the step motor 210 may be discharged from the optical disc drive through the use of the tensile structure of the first cover 220. In this example, the optical disc drive may form an electrostatic discharge structure through a current carrying path between the step motor 210 and the first cover 220 using the first electrostatic discharge mechanism.

Figure 3:
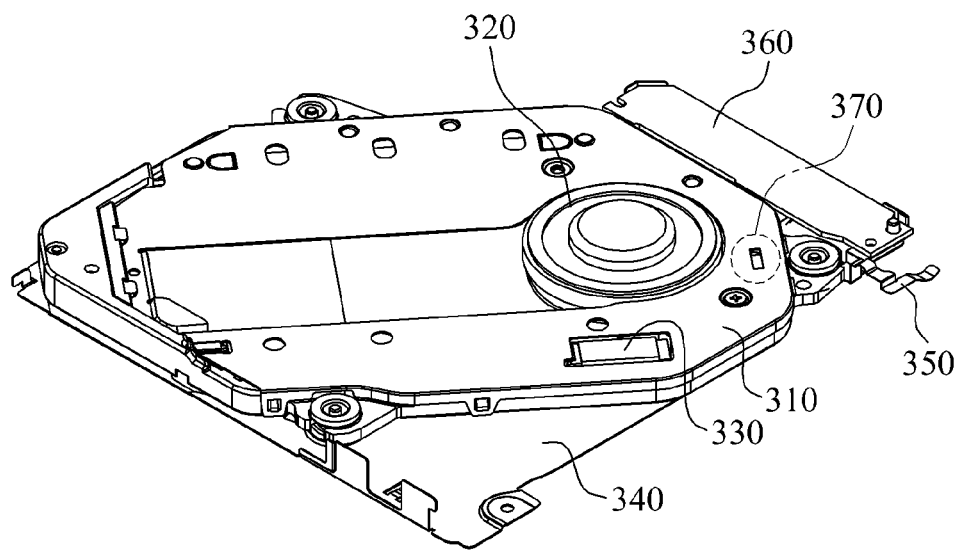
FIG. 3 is a diagram illustrating an example of a second cover including a second electrostatic discharge mechanism.

FIG. 3 illustrates an example of a second cover 310 including a second electrostatic discharge mechanism.

Referring to FIG. 3, an optical disc drive includes the second cover 310 that is configured to be disposed on an optical pickup (not shown), a spindle motor 320 configured to drive an optical disc, and a screw (not shown), fastened to the spindle motor 320. FIG. 3 also illustrates a step motor 330 that is used to move the optical pickup back and forth, and a first cover 340 disposed below the optical pickup. In this example, the first cover 340 corresponds to an underneath side of the first cover 120 shown in FIG. 1.

According to various aspects, the second cover 310 includes an electrostatic discharge mechanism (hereinafter, also referred to as a second electrostatic discharge mechanism) 370 that is used to discharge static electricity generated on the second cover 310. The second cover 310 and a screw may be connected to each other through the electrostatic discharge mechanism 370 disposed on the second cover 310.

Static electricity generated on the second cover 310 may be moved to the screw through the electrostatic discharge mechanism 370 and discharged to a ground through the screw and the spindle motor 320. For example, static electricity generated on the second cover 310 may be moved to the ground by being sequentially passed through the screw connected to the second cover 310 using a tension structure of the second cover 310, the spindle motor 320, a ground plate 350 connected to the spindle motor 320, and a circuit board 360 connected to the ground plate 350.

In the second electrostatic discharge mechanism 370, a portion of the second cover 310 may include a tension structure for connecting the second cover 310 to the screw. Because the tension structure of the second cover 310 is connected to the screw fastened to the spindle motor 320, static electricity generated on the second cover 310 may be moved to the spindle motor 320 by being passed through the screw. That is, the second electrostatic discharge mechanism 370 may connect the second cover 310 to the screw using the tension structure so that static electricity generated on the second cover 310 may be moved through the screw.

Accordingly, the optical disc drive may externally discharge static electricity generated on the second cover 310, for example, to a ground of a circuit board using the tension structure without the need for using or designing a separate part for discharging static electricity.

In some examples, the optical disc drive may externally discharge static electricity generated on a step motor and on the second cover using the first electrostatic discharge mechanism of FIG. 1 and the second electrostatic discharge mechanism of FIG. 3, respectively. In addition, the optical disc drive may autonomously discharge static electricity using the tension structure of the first cover and the second cover, without using a separate part.

Figure 4:
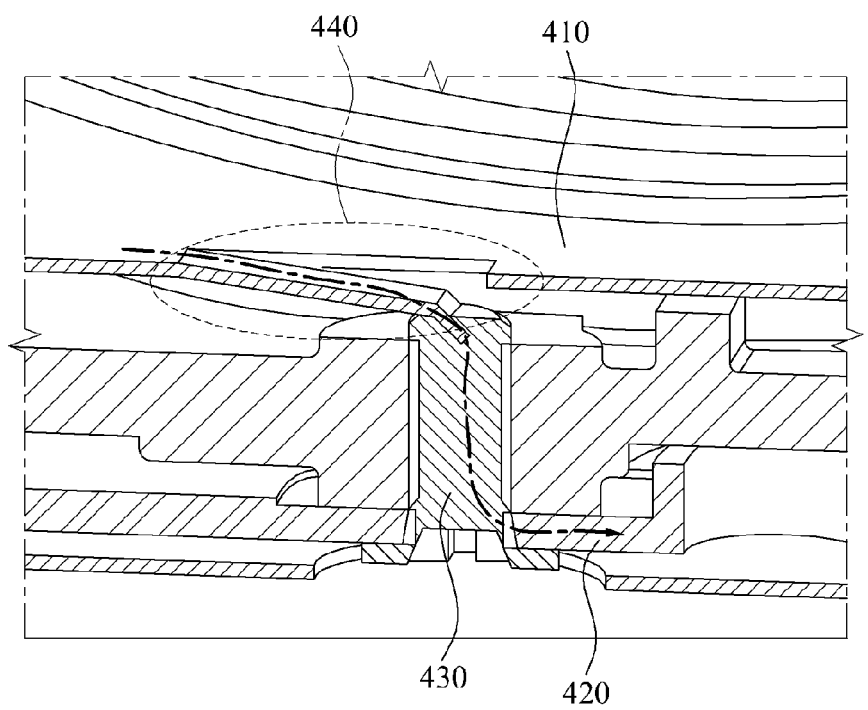
FIG. 4 is a diagram illustrating an example of a second electrostatic discharge mechanism.

FIG. 4 illustrates an example of a second electrostatic discharge mechanism.

Referring to FIG. 4, a second electrostatic discharge mechanism may connect a second cover 410 to a spindle motor 420 using a tension structure as indicated by a dotted line circle 440. For example, an end of the tension structure of the second cover 410 may be inserted into a space at the tip of the screw. As another example, the end of the tension structure of the second cover 410 may rest against the tip of the screw without being inserted into a space.

In this example, the tension structure of the second cover 410 and the screw 430 may be connected to each other without a separate part. Accordingly, static electricity generated on the second cover 410 may be moved to the screw 430, and static electricity moved to the screw 430 may be moved to a ground of a circuit board (not shown) through the spindle motor 420 connected to the screw 430 and a ground plate (not shown). Accordingly, an optical disc drive discharge static electricity by forming a current moving path through the second cover 410, the screw 430, and the spindle motor 420 using the second electrostatic discharge mechanism.

According to various aspects, it is possible to discharge static electricity externally, using an internal structure of an optical disc drive without using a separate part. For example, the optical disc drive may include one or more of the first cover and the second cover described in the examples of FIGS. 1 though 4 to remove static electricity generated by various components of the optical disc drive.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive, comprising:
a step motor configured to move an optical pickup back and forth; and
a cover disposed below the optical pickup, the cover comprising an electrostatic discharge mechanism for removing static electricity generated on the step motor,
wherein the electrostatic discharge mechanism includes a portion of the cover that comprises a tension structure that electrically connects the cover to the step motor.

2. The optical disc drive of claim 1, wherein the electrostatic discharge mechanism is disposed on the cover to electrically connect the cover and the step motor.

3. A optical drive comprising:
a step motor configured to move an optical pickup back and forth; and
a cover disposed below the optical pickup, the cover comprising an electrostatic discharge mechanism for removing static electricity generated on the step motor,
wherein static electricity generated on the step motor is moved to a ground through the cover that is electrically connected to the electrostatic discharge mechanism.

4. An optical disc drive comprising:
a step motor configured to move an optical pickup back and forth; and
a cover disposed below the optical pickup, the cover comprising an electrostatic discharge mechanism for removing static electricity generated on the step motor,
wherein static electricity generated on the step motor is moved to a ground by sequentially passing the static electricity through the cover, a ground plate electrically connected to the cover, and a circuit board electrically connected to the ground plate.

5. An optical disc drive, comprising:
a step motor configured to move an optical pickup back and forth;
a cover disposed below the optical pickup, the cover comprising an electrostatic discharge mechanism for removing static electricity generated on the step motor;
a ground plate electrically connected to the cover; and
a circuit board electrically connected to the ground plate,
wherein a portion of the cover comprises a tension structure that electrically connects the cover to the step motor, and static electricity generated on the step motor is moved to the cover through the tension structure and discharged externally through the ground plate and the circuit board.

6. An optical disc drive, comprising:
a spindle motor configured to drive an optical disc;
a screw fastened to the spindle motor; and
a cover disposed on an optical pickup of the optical disc drive, the cover comprising an electrostatic discharge mechanism for removing static electricity generated on the cover through the screw.

7. The optical disc drive of claim 6, wherein the electrostatic discharge mechanism includes a portion of the cover that comprises a tension structure that electrically connects the cover to the screw.

8. The optical disc drive of claim 6, wherein the electrostatic discharge mechanism is disposed on the cover to electrically connect the cover and the screw.

9. The optical disc drive of claim 6, wherein static electricity generated on the cover is moved to a ground through the screw that is electrically connected to the electrostatic discharge mechanism.

10. The optical disc drive of claim 6, wherein static electricity generated on the cover is moved to a ground by sequentially passing the static electricity through the screw, the spindle motor, a ground plate electrically connected to the spindle motor, and a circuit board electrically connected to the ground plate.

11. The optical disc drive of claim 6, further comprising:
a ground plate electrically connected to the spindle motor; and
a circuit board electrically connected to the ground plate,
wherein a portion of the cover comprises a tension structure that electrically connects the cover to the screw, and static electricity generated on the cover is moved to the screw through the tension structure and discharged externally through the ground plate and the circuit board.

12. An optical disc drive, comprising:
a step motor configured to move an optical pickup back and forth;
a first cover disposed below the optical pickup;
a second cover disposed on the optical pickup;
a spindle motor configured to drive an optical disc; and
a screw fastened to the spindle motor,
wherein the first cover comprises a first electrostatic discharge mechanism for moving static electricity generated on the step motor through the first cover, and the second cover includes a second electrostatic discharge mechanism for moving static electricity generated on the second cover through the screw.

13. The optical disc drive of claim 12, wherein the first electrostatic discharge mechanism includes a portion of the first cover that comprises a tension structure that electrically connects the first cover to the step motor, and
the second electrostatic discharge mechanism includes a portion of the second cover that comprises a tension structure that electrically connects the second cover to the screw.

* * * * *